US006419282B1

(12) United States Patent
Hornby

(10) Patent No.: US 6,419,282 B1
(45) Date of Patent: Jul. 16, 2002

(54) COMPLIANT ZERO EVAPORATIVE FUEL CONNECTION

(75) Inventor: Michael T. Hornby, Williamsburg, VA (US)

(73) Assignee: Siemens Automotive Corporation, Auburn Hills, MI (US)

(*) Notice: Subject to any disclaimer, the term of this patent is extended or adjusted under 35 U.S.C. 154(b) by 0 days.

(21) Appl. No.: 09/575,731

(22) Filed: Aug. 9, 2000

(51) Int. Cl.[7] .............................................. F16L 39/00

(52) U.S. Cl. ...................... 285/319; 285/305; 285/348; 285/336; 285/918; 277/910; 277/613

(58) Field of Search ................................ 277/613, 910; 285/308, 305, 348, 319, 336, 347, 349, 351, 379, 918

(56) References Cited

U.S. PATENT DOCUMENTS

| | | | | |
|---|---|---|---|---|
| 25,724 A | | 10/1859 | Colrin | |
| 2,249,127 A | | 7/1941 | Goetze | |
| 2,494,598 A | | 1/1950 | Warning | |
| 2,767,768 A | | 10/1956 | Jelinek | |
| 2,859,061 A | | 11/1958 | Reid | |
| 3,285,631 A | | 11/1966 | Stolpmann | |
| 3,687,494 A | | 8/1972 | Graff | |
| 5,022,663 A | | 6/1991 | Fages et al. | |
| 5,213,346 A | | 5/1993 | Thomson et al. | |
| 5,286,066 A | * | 2/1994 | Yang | 285/305 |
| 5,538,262 A | | 7/1996 | Matsumura | |
| 5,775,738 A | * | 7/1998 | Bartholomew | 285/319 |
| 5,794,984 A | * | 8/1998 | Bartholomew | 285/319 |
| 5,797,604 A | | 8/1998 | Inagaki et al. | |
| 5,927,761 A | * | 7/1999 | Bartholomew | 285/319 |
| 5,988,268 A | | 11/1999 | Usami et al. | |

* cited by examiner

*Primary Examiner*—Lynne H. Browne
*Assistant Examiner*—Aaron Dunwoody

(57) ABSTRACT

A fluid assembly is disclosed. The fluid assembly includes a first conduit having a generally annular first body and a first longitudinal channel extending therethrough and a second conduit having a generally annular second body disposed over a portion of the first conduit and having a second longitudinal channel in communication with the first longitudinal channel. The second conduit further includes a retainer fixture. The assembly also includes a seal assembly including an annular seal having first and second seal members, an o-ring disposed within the seal generally against the first and second members, and a retainer biasing the o-ring toward the first and second seal members. The seal assembly is disposed between the first fuel conduit and the second fuel conduit such that the first seal member engages the first conduit and the second seal member engages the second conduit. The retainer engages the retainer fixture, and the seal assembly releasably connects the first conduit and the second conduit. A method of forming a vapor barrier between first and second conduits in a fluid assembly is also provided.

17 Claims, 2 Drawing Sheets

COMPLIANT ZERO EVAPORATIVE FUEL CONNECTION

BACKGROUND OF INVENTION

Field of the Invention

The present invention relates to a connection, between a fuel injector and a fuel supply souce, which prevent evaporation of fuel between the fuel injector and the fuel supply source.

The fuel system on an automobile has several connections between the fuel tank and the fuel injectors which are part of the fuel system. The fuel is delivered to the fuel injectors through a fuel rail in which the fuel is pressurized. Each connection in the fuel system has the potential to allow fuel to evaporate through elastomeric seals which make up the connection. O-rings are typically used for these seals. Shed soak tests, in which a fuel system is immersed in a fluid, are used to measure hydrocarbon evaporation from the fuel system. Even though the o-ring seals prevent liquid fuel from leaking from the fuel system, the o-ring seals allow vaporized fuel to escape from the fuel system and into the atmosphere.

To alleviate this problem, a rigid connection was used to minimize the evaporative hydrocarbons, leading to the components that make up the fuel assembly being bolted together or otherwise connected with hard connections. This approach resulted in difficult tolerance stack-ups between the engine intake manifold and the fuel rail.

It would be beneficial to develop a fuel system having a compliant, flexible connection between two fuel system members which allows little to no evaporative outgassing.

BRIEF SUMMARY OF THE PRESENT INVENTION

Briefly, a fluid assembly is disclosed. The fluid assembly comprises a first conduit having a generally annular first body and a first longitudinal channel extending therethrough and a second conduit having a generally annular second body disposed over a portion of the first conduit and having a second longitudinal channel in communication with the first longitudinal channel. The second conduit further includes a retainer fixture. The assembly also includes a seal assembly including an annular seal having first and second seal members, an o-ring disposed within the seal generally against the first and second members, and a retainer biasing the o-ring toward the first and second seal members. The seal assembly is disposed between the first fuel conduit and the second fuel conduit such that the first seal member engages the first conduit and the second seal member engages the second conduit. The retainer engages the retainer fixture, and the seal assembly releasably connects the first conduit and the second conduit.

A method of sealing a first fuel conduit having generally annular first body and a first longitudinal channel extending therethrough and a second fuel conduit having a generally annular second body and a second longitudinal channel extending therethrough with a seal assembly is also provided. The seal assembly has an annular seal having first and second seal members, an o-ring disposed within the seal generally against the first and second members; and a retainer biasing the o-ring toward the first and second seal members. The method comprises inserting the o-ring into the seal and forming a seal subassembly; inserting the retainer clip and the seal subassembly over the first conduit; disposing the second conduit over the first conduit such that the first longitudinal channel is in communication with the second longitudinal channel, and such that the second conduit biases at least a portion of the retainer clip from a first position in a first direction; and further disposing the second conduit over the first conduit, the at least portion of the retainer clip returning toward the first position, the retainer clip releasably retaining the second conduit over the first conduit.

A method of forming a vapor barrier between a first conduit and a second conduit is also provided. The method comprises providing a first conduit having a first conduit end, a first channel extending therethrough and an exterior perimeter surrounding the channel; inserting a seal assembly over the end of the first conduit, the seal circumscribing the exterior perimeter, the seal assembly including a seal having a first member and a second member and an o-ring disposed against each of the first and second members; providing a second conduit having a second conduit end and a second channel extending therethrough; and inserting the second channel over the first conduit end and the seal assembly such that the first conduit is in communication with the second conduit, forming a gap between the first conduit and the second conduit, the o-ring biasing the first sealing member against the first conduit and the second sealing member against the second conduit, the seal extending across the gap.

Summary of Invention

Briefly, a fluid assembly is disclosed. The fluid assembly comprises a first conduit having a generally annular first body and a first longitudinal channel extending therethrough and a second conduit having a generally annular second body disposed over a portion of the first conduit and having a second longitudinal channel in communication with the first longitudinal channel. The second conduit further includes a retainer fixture. The assembly also includes a seal assembly including an annular seal having first and second seal members, an o-ring disposed within the seal generally against the first and second members, and a retainer biasing the o-ring toward the first and second seal members. The seal assembly is disposed between the first fuel conduit and the second fuel conduit such that the first seal member engages the first conduit and the second seal member engages the second conduit. The retainer engages the retainer fixture, and the seal assembly releasably connects the first conduit and the second conduit.

A method of sealing a first fuel conduit having generally annular first body and a first longitudinal channel extending therethrough and a second fuel conduit having a generally annular second body and a second longitudinal channel extending therethrough with a seal assembly is also provided. The seal assembly has an annular seal having first and second seal members, an o-ring disposed within the seal generally against the first and second members; and a retainer biasing the o-ring toward the first and second seal members. The method comprises inserting the o-ring into the seal and forming a seal subassembly; inserting the retainer clip and the seal subassembly over the first conduit; disposing the second conduit over the first conduit such that the first longitudinal channel is in communication with the second longitudinal channel, and such that the second conduit biases at least a portion of the retainer clip from a first position in a first direction; and further disposing the second conduit over the first conduit, the at least portion of the retainer clip returning toward the first position, the retainer clip releasably retaining the second conduit over the first conduit.

A method of forming a vapor barrier between a first conduit and a second conduit is also provided. The method comprises providing a first conduit having a first conduit end, a first channel extending therethrough and an exterior perimeter surrounding the channel; inserting a seal assembly over the end of the first conduit, the seal circumscribing the exterior perimeter, the seal assembly including a seal having a first member and a second member and an o-ring disposed against each of the first and second members; providing a second conduit having a second conduit end and a second channel extending therethrough; and inserting the second channel over the first conduit end and the seal assembly such that the first conduit is in communication with the second conduit, forming a gap between the first conduit and the second conduit, the o-ring biasing the first sealing member against the first conduit and the second sealing member against the second conduit, the seal extending across the gap.

BRIEF DESCRIPTION OF DRAWINGS

The accompanying drawings, which are incorporated herein, and constitute part of this specification, illustrate the presently preferred embodiments of the invention, and, together with the general description given above and the detailed description given below, serve to explain the features of the invention. In the drawings.

DETAILED DESCRIPTION

Figure 1:
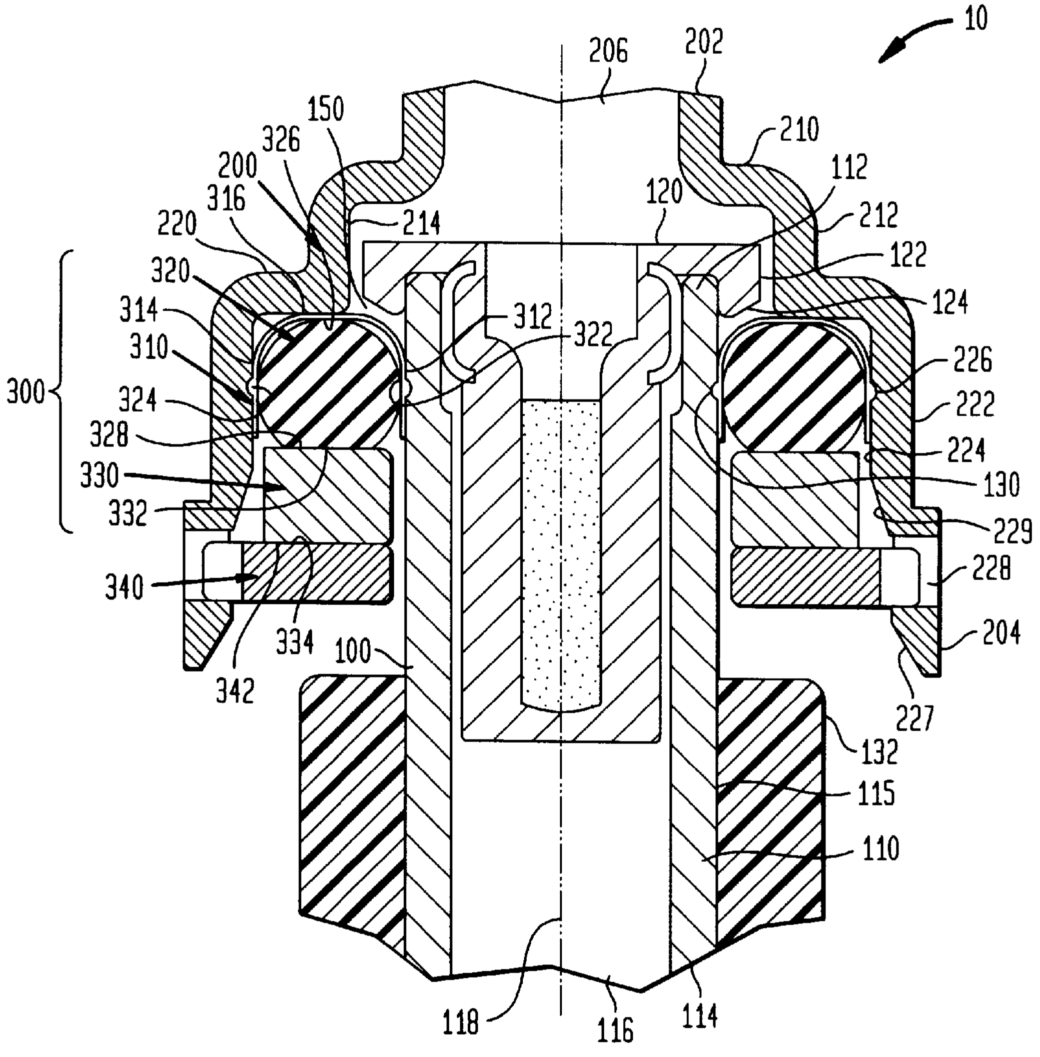
FIG. 1 is a side view, in section, of the fuel supply assembly according to a first embodiment of the present invention.

A first embodiment of a fluid assembly 10 is shown in FIG. 1. As used herein, like elements indicate like components throughout. The fluid assembly 10 (hereinafter assembly 10) includes a first conduit in the form of a fuel injector 100, a second conduit in the form of a fuel supply cup 200, and a seal assembly 300, which both connects the fuel injector 100 to the fuel supply cup 200 and prevents vaporized fuel from escaping between the fuel injector 100 and the fuel supply cup 200. For the purposes of this disclosure, only an upstream portion of the fuel injector 100 is shown, although those skilled in the art will recognize and understand the operation of the remaining part of the fuel injector 100, not shown. Although the first conduit is a fuel injector 100 and the second conduit is a fuel supply cup 200, those skilled in the art will recognize that the first and second conduits can be other components instead.

The fuel injector 100 has a generally annular body 110 having a first end 112 and a second end 114. The body 110 also has an exterior perimeter 115. A longitudinal channel 116 extending therethrough along a longitudinal axis 118 between the first end 112 and the second end 114. Preferably, a fuel filter 120 is disposed in the longitudinal channel 116 at the first end 112. However, those skilled in the art will recognize that the fuel filter can be disposed in other locations in the longitudinal channel 116, such as downstream in the longitudinal channel 116. As used herein, the terms upstream and downstream refer to directions toward the top and bottom, respectively, of the drawing to which is being referred.

The fuel filter 120 includes a lip 122 which extends outside the exterior perimeter 115, away from the longitudinal axis 118. For embodiments in which the fuel filter 120 is disposed in other locations, the lip 122 can be on the first end 112 of the body 110. Preferably, the lip 122 has a chamfered surface 124, although those skilled in the art will recognize that the chamfered surface 124 can be omitted.

Preferably, a groove 130 circumscribes the exterior perimeter 115 proximate to the first end 112. Additionally, a dielectric overmold 132 extends from and circumscribes the second end 114.

The assembly 10 further includes the fuel supply cup 200. The cup 200 has a generally annular second body which is disposed over a portion of the fuel injector 100 and has a first, or upstream, end 202 and a second, or downstream, end 204. The cup also has a second longitudinal channel 206 in communication with the first longitudinal channel 116. Preferably, the first longitudinal channel 116 and the second longitudinal channel 206 are generally co-axial along the longitudinal axis 118, although those skilled in the art will recognize that the first longitudinal channel 116 and the second longitudinal channel 206 need not be generally co-axial. Also preferably, the cup 200 is a formed or a machined piece, and is constructed from a metal or a polymer.

The cup 200 has three steps in diameter. When the cup 200 is installed on the fuel injector 100, a first, or smaller, ledge 210 keeps the fuel injector 100 from travelling too far into the first end 202 of the cup 200. A second, or larger, ledge 220 is the compression step for the seal assembly 300, which will be described in more detail later herein. A wall 212 between the first and second ledges 210, 220 has in interior perimeter 214. A wall 222 downstream of the second ledge 220 has an interior perimeter 224. A groove 226 is cut in the interior perimeter 224 generally co-planar with the groove 130 in the fuel injector 100.

The downstream end 204 includes a first chamfered surface 227 which assists in installing the seal assembly 300, which also will be described in more detail later herein. The downstream end 204 also includes a retaining fixure in the form of a groove 228 immediately upstream of the first chamfered surface 227. The downstream end also includes a second chamfered surface 229 between the groove 228 and the groove 226.

When the cup 200 is inserted over the fuel injector 100, a gap 150 is formed between the cup 200 and the fuel injector 100.

The seal assembly 300 includes an annular, generally U-shaped seal 310 having first and second generally parallel seal members 312, 314 and a bight member 316 connecting the first seal member 312 and the second seal member 314. Preferably, the seal 310 is constructed from metal or a polymer and is vacuumed formed from a single sheet. However, those skilled in the art will recognize that the seal 310 can be constructed from other suitable materials and that the seal 310 can be formed in other manners.

The seal assembly 300 also includes an o-ring 320 which is disposed within the seal 310 generally between and against the first and second members 312, 314 and against the bight member 316. Preferably, the o-ring 320 is formed from rubber or other deformable material. The o-ring 320 generally has a first side 322, a second side 324, a top side 326, and a bottom side 328.

The seal assembly 300 also includes an annular compression ring 330 and a retainer clip 340. The compression ring 330 has first and second opposing compression ring faces 332, 334. Preferably, the compression ring 330 is constructed from a metal or a polymer, and more preferably, from carbon steel. The compression ring 330 is disposed between the o-ring 320 and the retainer clip 340 such that the first compression ring face 332 engages the o-ring 320 and the second compression ring face 334 engages a retainer clip 340. The retainer clip 340 has a first clip face 342 engaging the second compression ring face 334. Preferably, the retainer clip 340 is a c-clip, although those skilled in the art will recognize that other types of clips can be used. Additionally, those skilled in the art will recognize that a separate compression ring 330 may be omitted and the c-clip 340 may directly engage the o-ring 320.

The seal assembly 300 is disposed between the fuel injector 100 and the fuel supply cup 200 such that the first seal member 312 engages the exterior perimeter 115 of the fuel injector 100 and the second seal member 314 engages the interior perimeter 224 of the fuel supply cup 200. In this configuration, the seal 310 extends across and seals the gap 150 between the fuel injector 100 and the fuel supply cup 200. The gap 150 is sealed by the seal 310, and not by the o-ring 320. The seal 310 restricts fuel vapors which are upstream of the seal 310 from flowing past the seal 310 and escaping from the assembly 10. Additionally, the bight member 316 engages the interior perimeter 224 of the fuel supply cup 200. Those skilled in the art will recognize that the engagement of the bight member 316 with the interior perimeter 224 of the fuel supply cup 200 can provide a sealing area and that the second seal member 314 can be omitted from the seal 310.

The assembly 10 is assembled in the following manner. The o-ring 320 is inserted into the seal 310 between the first seal member 312 and the second seal member 314, forming a seal subassembly. The retainer clip 340, the compression ring 330, and the seal subassembly are inserted over the first end 112 of the fuel injector body 110, in the order recited so that the retainer clip 340, the compression ring 330, and the seal subassembly circumscribe the exterior perimeter 115 of the fuel injector 100. The seal subassembly is inserted so that the o-ring 320 is in contact with the compression ring 330. At this point, the seal assembly 300 is disposed between the lip 122 of the fuel filter 120 and the overmold 132.

The fuel supply cup 200 is inserted over the fuel injector body 110 so that the longitudinal channel 206 of the fuel cup 200 is inserted over the first end 112 of the fuel injector and the seal assembly 300. The chamfered surface 229 engages the seal 310 between the bight member 316 and the second member 314, compressing the second member 314 toward the first member 312. The chamfered surface 229 also acts as a lead in to assist insertion of the fuel supply cup 200 over the seal 310. The chamfered surface 227 engages the retainer clip 340 and compresses the retainer clip 340 toward the longitudinal axis 118, allowing the fuel supply cup 200 to continue being pressed onto the fuel injector 100. As the fuel cup 200 is further pressed over the fuel injector 100, the retainer clip 340 is aligned with the groove 228. The retainer clip 340 then snaps back toward its original position, and is retained at least partially into the groove 228. The retainer clip 340 is thus secured to the fuel supply cup 200. The retainer clip 340 biases the remaining elements of the seal assembly 300 against the second ledge 220. The retainer clip 340 biases the compression ring 330 against the o-ring 320, vertically compressing and deforming the o-ring 320. The bottom side 328 of the o-ring 320 flattens against the first compression ring face 332, and the top side 326 of the o-ring flattens against the bight member 316 of the seal 310, biasing the bight member 316 against the second ledge 220 of the fuel supply cup 200. Also, due to the vertical compression of the o-ring 320, the first and second sides 322, 324 of the o-ring bias apart from each other and engage the first and second seal members 312, 314, respectively, of the seal 310, biasing the first and second seal members 312, 314 away from each other. The first seal member 312 biases against the exterior perimeter 115 of the fuel injector 100, sealing the seal 310 against the fuel injector 100. The second seal member 314 biases against the interior perimeter 224 of the fuel supply cup 200, sealing the seal 310 against the fuel supply cup 200.

The first seal member 312 deforms at the groove 130 and engages the groove 130 on the fuel injector 100. The second seal member 314 deforms at the groove 226 and engages the groove 226 on the fuel supply cup 200. The engagement of the members 312, 314 with the grooves 130, 226, respectively, helps to retain the seal assembly 300 in place and retain the assembly 10 in its desired position along the longitudinal axis 118. Additionally, the engagement of members 312, 314 with the grooves 130, 226 decreases the chance for vapor leakage past the seal assembly 300. However, those skilled in the art will recognize that the grooves 130, 226 can be omitted. In the assembled condition, the first longitudinal channel 116 communicates with the second longitudinal channel 208.

To release the fuel supply cup 200 from the fuel injector 100, the retainer clip 340 is compressed toward the longitudinal axis 118 until the retainer clip 340 is released from the groove 228. At this point, the seal assembly 300, which is connecting the fuel supply cup 200 to the fuel injector 100, releases the fuel supply cup 200 from the fuel injector 100, and the fuel supply cup 200 can be disposed upstream along the longitudinal axis 118 and removed from the fuel injector 100.

Preferably, during operation, the assembly operates at a fluid pressure of between 3.5 bar and 4.5 bar, although those skilled in the art will recognize that the assembly 10 can be operated at pressures outside this range.

Figure 2:
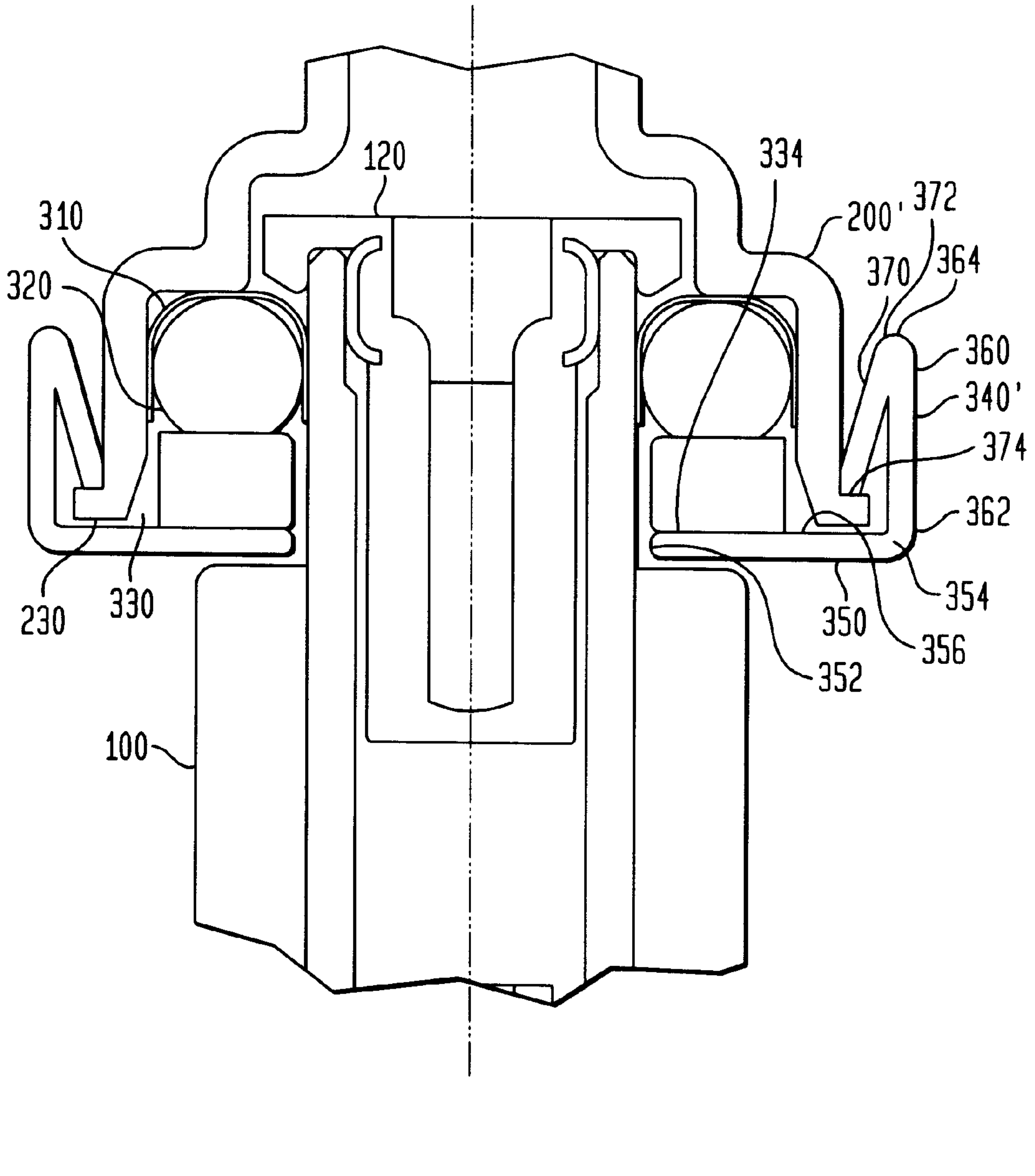
FIG. 2 is a side view, in section, of the fuel supply assembly according to a second embodiment of the present invention.

A second embodiment of the present invention is shown in FIG. 2. In this embodiment, a fuel supply cup 200' is used, which is similar to the fuel supply cup 200 described above, but does not include the grooves 226, 228. Additionally, the fuel supply cup 200' includes a retainer fixture in the form of a lip 230 at the downstream end 204, which extends away from the longitudinal axis 118.

Additionally, the seal assembly 300' is identical to the seal assembly 300 described above, but incorporates a different retainer clip 340'. The retainer clip 340' is generally an annular ring having a generally planar bottom surface 350 which is generally perpendicular to the longitudinal axis 118. The bottom surface 350 includes a first end 352 which is proximate to the longitudinal axis 118 and a second end 354 which is distal from the longitudinal axis 118. The bottom surface 350 also includes a top face 356, which engages the second compression ring face 334. A support leg 360, which extends generally parallel to the longitudinal axis 118, has a bottom end 362 fixedly connected to the second end 354 of the bottom surface, and a top end 364. A retaining leg 370 extends obliquely from the top end 364 generally downstream and toward the longitudinal axis 118. The retaining leg 370 includes a first end 372 fixedly connected to the top end 364 and a second end 374. The second end 374 is biased away from the support leg 360.

When the fuel supply cup 200 is inserted over the fuel injector 100, the lip 230 engages the retaining leg 370, and, as the lip 230 is disposed in the downstream direction, biases the second end 374 of the retaining leg 370 toward the support leg 360. When the second end 374 clears the lip 230, the second end 374 biases back toward its original position, securing the lip 230 between the second end 374 and the top face 356 of the bottom surface 350.

To disassemble the assembly 10, the second end 374 of the retaining leg 370 is biased toward the support leg 360 until the second end 374 of the retaining leg 370 clears the lip 230. At this point, the fuel supply cup 200 can be disposed upstream along the longitudinal axis 118 away from the fuel injector 100.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

What is claimed is:

1. A fluid assembly comprising:

a first conduit having a generally annular first body and a first longitudinal channel extending therethrough;

a second conduit having a generally annular second body disposed over a portion of the first conduit and having a second longitudinal channel in communication with the first longitudinal channel, the second conduit further including a retainer fixture; and a seal assembly being disposed between the first conduit and the second conduit such that a first seal member engages the first conduit and a second seal member engages the second conduit, the seal assembly including:

an annular seal having first and second seal members;

an o-ring proximate the first and second members; and a retainer biasing the o-ring toward the first and second seal members, the retainer engaging the retainer fixture, and the seal assembly releasably connecting the first conduit and the second conduit, wherein the first conduit further comprises a first groove on an exterior perimeter, the first seal member engaging the first groove.

2. The fluid assembly according to claim 1, wherein the seal assembly further comprises an annular compression ring disposed between the o-ring and the retainer.

3. The fluid assembly according to claim 1, wherein the seal further comprises a third seal member, the third seal member being connected to the second seal member and generally parallel to the first seal member.

4. The fluid assembly according to claim 3, wherein the second conduit further comprises a second groove on an interior perimeter, the third seal member engaging the second groove.

5. The fluid assembly according to claim 4, wherein the o-ring biases the first seal member away from the third seal member.

6. The fluid assembly according to claim 5, wherein the o-ring biases the second seal member against the second conduit.

7. The fluid assembly according to claim 1, wherein the seal is constructed from one of a metal and a polymer.

8. The fluid assembly according to claim 1, wherein the first conduit comprises a fuel injector.

9. The fluid assembly according to claim 1, wherein the second conduit comprises a fuel supply cup.

10. The fluid assembly according to claim 1, further comprising a gap between first conduit and the second conduit, the seal extending across the gap.

11. The fluid assembly according to claim 1, wherein the retainer fixture is a groove.

12. The fluid assembly according to claim 1, wherein the retainer fixture is a lip.

13. The method of sealing a first fuel conduit having generally annular first body and a first longitudinal channel extending therethrough and a second fuel conduit having a generally annular second body and a second longitudinal channel extending therethrough with a seal assembly, the seal assembly having:

an annular seal having first and second seal members;

an o-ring disposed within the seal generally against the first and second members; and a retainer biasing the o-ring toward the first and second seal members;

the method comprising:

inserting the o-ring into the seal and forming a seal subassembly;

inserting a retainer clip and the seal subassembly over the first conduit;

disposing the second conduit over the first conduit such that the first longitudinal channel is in communication with the second longitudinal channel, and such that the second conduit biases at least a portion of the retainer clip from a first position in a first direction; and further disposing the second conduit over the first conduit, the at least portion of the retainer clip returning toward the first position, the retainer clip releasably retaining the second conduit over the first conduit.

14. The method according to claim 13, further comprising inserting an annular compression ring between the retainer clip and the o-ring.

15. A method of forming a vapor barrier between a first conduit and a second conduit comprising:

providing a first conduit having a first conduit end, a first channel extending therethrough and an exterior perimeter surrounding the channel;

inserting a seal assembly over the end of the first conduit, the seal assembly circumscribing the exterior perimeter, the seal assembly including a seal having a first member and a second member and an o-ring disposed against each of the first and second members;

providing a second conduit having a second conduit end and a second channel extending therethrough; and inserting the second channel over the first conduit end and the seal assembly such that the first conduit is in communication with the second conduit, the first conduit forming a gap with the second conduit, the o-ring biasing the first sealing member against the first conduit and the second sealing member against the second conduit, the seal extending across the gap.

16. The method according to claim 15, wherein the seal assembly further comprises a retainer clip biasing the o-ring against the seal, the method further comprising the retainer clip releasably engaging the second conduit.

17. The method according to claim 16, further comprising the seal assembly releasably connecting the first conduit to the second conduit.

* * * * *